US011009165B2

(12) United States Patent
Tiberghien et al.

(10) Patent No.: US 11,009,165 B2
(45) Date of Patent: May 18, 2021

(54) COUPLING ELEMENT AND COUPLING DEVICE COMPRISING THIS COUPLING ELEMENT

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR); Romain Mayer, Hery sur Ugine (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 16/369,213

(22) Filed: Mar. 29, 2019

(65) Prior Publication Data
US 2019/0316718 A1 Oct. 17, 2019

(30) Foreign Application Priority Data

Apr. 12, 2018 (FR) ...................................... 1853212

(51) Int. Cl.
F16L 37/34 (2006.01)
F16L 29/04 (2006.01)
(Continued)

(52) U.S. Cl.
CPC .............. F16L 37/34 (2013.01); F16L 29/04 (2013.01); F16L 37/23 (2013.01); F16L 37/33 (2013.01);
(Continued)

(58) Field of Classification Search
CPC ..... Y10T 137/87949; Y10T 137/87957; Y10T 137/87965; F16L 37/40; F16L 37/407; F16L 37/36; F16L 37/28
(Continued)

(56) References Cited

U.S. PATENT DOCUMENTS 3,646,964 A * 3/1972 Stratman ................. F16L 37/30
137/614.03
4,373,551 A * 2/1983 Shindelar ................ F16L 37/32
137/614.04

(Continued)

FOREIGN PATENT DOCUMENTS

DE 102014010570 A1 1/2016
EP 0932791 A1 8/1999
EP 3069066 A1 9/2016

OTHER PUBLICATIONS

Search Report from corresponding French Application No. 1853212, dated Jul. 24, 2018.

Primary Examiner — Craig J Price

(57) ABSTRACT

A fluid coupling element includes a body having a rear chamber and an intermediate chamber, a main valve movable to close a main passage between the rear and intermediate chambers, a forward valve movable to close a front orifice of the inner pipe under the action of a first spring, and a safety valve movable to close a secondary passage through the main valve between the rear and intermediate chambers. During coupling with a complementary coupling element, the forward valve moves a plunger that opens the safety valve before the main valve is opened. The coupling element includes a second spring, pushing the plunger back toward a forward position in which the main valve and the safety valve are closed, and the plunger abuts against the main valve or against the safety valve.

15 Claims, 12 Drawing Sheets

(51) Int. Cl.
 *F16L 37/23* (2006.01)
 *F16L 37/33* (2006.01)
 *F16L 37/407* (2006.01)
(52) U.S. Cl.
 CPC ...... *F16L 37/407* (2013.01); *Y10T 137/87957* (2015.04)
(58) Field of Classification Search
 USPC .................................. 137/614–614.06, 798
 See application file for complete search history.

(56) References Cited

U.S. PATENT DOCUMENTS

| | | | | |
|---|---|---|---|---|
| 4,540,021 A * | 9/1985 | Rogers | .................... | F16L 37/23 137/614.05 |
| 5,159,955 A * | 11/1992 | Ekman | .................... | F16L 37/23 137/614 |
| 5,383,492 A * | 1/1995 | Segal | .................... | F16L 37/23 137/613 |
| 5,592,970 A * | 1/1997 | Stucchi | .................... | F16L 37/34 137/614.03 |
| 6,026,857 A * | 2/2000 | Stucchi | .................... | F16L 37/23 137/614.03 |
| 6,056,010 A * | 5/2000 | Wells | .................... | F16L 37/34 137/614 |
| 6,095,190 A * | 8/2000 | Wilcox | .................... | F16L 37/23 137/614 |
| 6,860,290 B2 * | 3/2005 | Knuthson | ............... | F16L 37/30 137/594 |
| 8,960,726 B2 * | 2/2015 | Nick | .................... | F16L 19/005 285/84 |
| 9,709,199 B2 * | 7/2017 | Laufer | .................... | F16L 29/04 |
| 9,726,311 B2 * | 8/2017 | Danelli | .................... | F16K 17/02 |
| 10,156,310 B2 * | 12/2018 | Foner | .................... | F16L 37/34 |
| 10,161,552 B2 * | 12/2018 | Tiberghien | .............. | F16L 37/34 |
| 10,260,665 B2 * | 4/2019 | Allevi | .................... | F16L 37/23 |
| 10,386,017 B2 * | 8/2019 | Thomas | .................... | F17C 5/06 |
| 2004/0079423 A1 * | 4/2004 | Mikiya | .................... | F16L 37/34 137/614.03 |
| 2005/0103387 A1 * | 5/2005 | Voege | .................... | F16L 37/36 137/614.04 |
| 2006/0130910 A1 * | 6/2006 | Knuthson | ............... | F16L 37/18 137/614.02 |
| 2006/0273580 A1 * | 12/2006 | Marquis | .................... | F16L 37/56 285/124.5 |
| 2012/0013120 A1 * | 1/2012 | Rusconi | .................... | F16L 37/36 285/308 |
| 2014/0373949 A1 * | 12/2014 | Manzato | .................... | F16L 37/34 137/614.04 |
| 2016/0018036 A1 * | 1/2016 | Laufer | .................... | F16L 37/34 251/149.7 |
| 2016/0290542 A1 * | 10/2016 | Gatti | .................... | F16K 11/185 |
| 2016/0290543 A1 * | 10/2016 | Gatti | .................... | F16L 37/56 |
| 2017/0138522 A1 * | 5/2017 | Foner | .................... | F16L 37/34 |
| 2017/0321836 A1 * | 11/2017 | Danelli | .................... | F16L 37/34 |
| 2019/0383433 A1 * | 12/2019 | Tiberghien | ............ | F16L 37/407 |

* cited by examiner

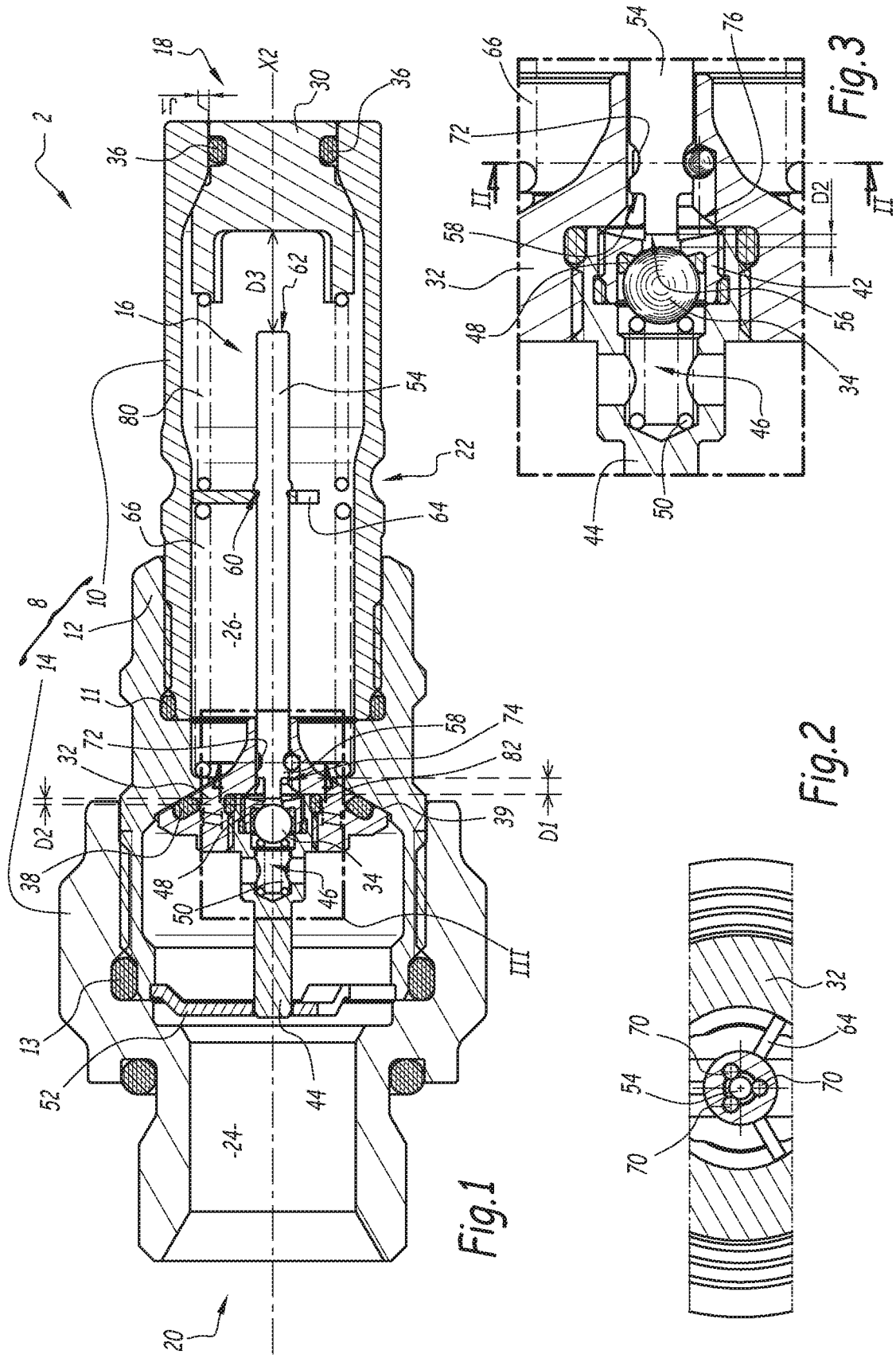

COUPLING ELEMENT AND COUPLING DEVICE COMPRISING THIS COUPLING ELEMENT

CROSS-REFERENCE TO RELATED APPLICATIONS

This application claims priority to French application no. 1,853,212, filed on Apr. 12, 2018.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The invention relates to a coupling element as well as a coupling device comprising such a coupling element.

Description of the Related Art

Coupling elements allow an easy and quick tight connection for the transport of a fluid, in particular a pressurized fluid. Two coupling elements of a complementary type, for example a male type and a female type, are suitable for being coupled in order to couple two systems, such as lines, or reservoirs, or machines. In practice, each coupling element includes a body that delimits an inner pipe for the passage of a fluid. One of the coupling elements is connected to a pressurized fluid pipe located upstream, for example containing oil able to reach a pressure of 150 to 450 bars.

Patent EP 0,932,791 B1 discloses a known coupling element, in which an intermediate chamber is formed inside the body, between the outlet of the coupling element and a rear chamber connected to a pressurized fluid pipe. The coupling element includes a forward valve, a main valve and a safety valve actuated by a movable plunger. The forward valve withdraws when the coupling element is coupled with a complementary coupling element, which causes the plunger to slide and opens the safety valve. The front valve next abuts against the main valve, which opens the main valve.

The intermediate chamber makes it possible, owing to the action of the safety valve, to allow a small quantity of pressurized fluid to pass before moving the main valve toward its open position. This makes it possible to reduce the pressure in the rear chamber, in particular if the complementary coupling element is connected to a large low-pressure volume, and to open the main valve with less force.

However, this known coupling element has many drawbacks. In particular, the position of the plunger is undetermined at the beginning of the coupling of the coupling element. There is thus a risk that in some cases, the plunger may remain in a position in which it actuates the opening of the main valve without having first opened the safety valve. During uncoupling, accidental jamming of the plunger in the main valve could keep the safety valve open, leaving the intermediate chamber at the same pressure as the rear chamber when the coupling element is uncoupled. This may make the forward valve difficult to open and the coupling element difficult to re-couple later.

BRIEF SUMMARY OF THE INVENTION

The invention therefore aims to propose a coupling element that resolves the aforementioned drawbacks.

To that end, the invention relates to a fluid coupling element, including:
- a body that delimits an inner pipe extending along a longitudinal axis, the inner pipe comprising a rear chamber and an intermediate chamber, in which a front orifice of the inner pipe emerges;
- a main valve translatable in the rear chamber between a closed position, in which the main valve abuts forwardly against the body, and an open position in which a main passage is arranged between the main valve and the body for the fluid communication between the rear chamber and the intermediate chamber;
- a forward valve, translatable in the intermediate chamber between a closed position and an open position of the front orifice, the forward valve being pushed back toward the closed position by a first spring;
- a safety valve, translatable between an open position of a secondary passage arranged through the main valve between the rear chamber and the intermediate chamber and a closed position of the secondary passage, in which the safety valve abuts forwardly against the main valve;
- a plunger movable in the body between a forward position and a withdrawn position, the plunger being movable relative to the safety valve along the longitudinal axis;
the coupling element being arranged such that, during coupling with a complementary coupling element during which the forward valve is moved toward its open position of the front orifice, the forward valve comes into contact with the plunger and moves the plunger toward the withdrawn position, the plunger coming into contact with the safety valve and moving it into the open position of the secondary passage before the main valve is moved toward its open position.

According to the invention, the coupling element includes a second spring, arranged in the intermediate chamber bearing on the body and on a bearing part of the plunger and pushing the plunger back toward the forward position. In the forward position of the plunger, the main valve and the safety valve are in the closed position, and the plunger abuts forwardly against the main valve or against the safety valve.

Owing to the invention, because the plunger is movable axially relative to the safety valve, and therefore separated from the safety valve, it is possible to build a long plunger and therefore to obtain a coupling travel between the coupling element and a complementary coupling element that is shorter, for an identical intermediate chamber volume, without detriment to the tightness of the safety valve at its seat. Furthermore, the forward abutment of the plunger on the safety valve or on the main valve when the plunger is in its forward position guarantees a minimal travel of the forward valve before actuation of the plunger, upon opening of the safety valve and upon opening of the main valve during the coupling phase, which allows the fluid communication between the male and female coupling elements to open before the presence of pressurized fluid from the intermediate chamber. Lastly, placing the second spring in the intermediate chamber makes it possible to limit the effect of the pressurized fluid on the spring and to obtain a more compact construction of the coupling element.

According to advantageous but optional aspects of the invention, such a coupling element may incorporate one or more of the following features, considered alone or according to any technically allowable combination:

In the forward position, the plunger abuts forwardly against the main valve and the coupling element includes a third spring that returns the safety valve into its closed position of the secondary passage.

The third spring is inserted between the safety valve and the main valve.

The plunger abuts forwardly against the main valve by means of at least one ball housed in a longitudinal slot of the main valve and in a peripheral groove of the plunger.

In the forward position, the plunger abuts forwardly against the safety valve and a forward rod of the safety valve, protruding in front of the main valve, is engaged in the plunger.

The coupling element is arranged such that, during coupling with a complementary coupling element, the plunger or the safety valve comes into contact with the main valve to move the main valve from its closed position toward its open position.

The first spring is arranged bearing on the forward valve and on the bearing part of the plunger.

The first spring and the second spring are helical compression springs, the turns of which are aligned along the longitudinal axis and arranged in the outer radial position in the inner pipe.

The return force exerted by the second spring when the plunger is in the forward position is greater than the return force exerted by the first spring when the forward valve and the main valve are in the open position.

The bearing part of the plunger is suitable for radially guiding the plunger inside the body in its movement between the forward position and the withdrawn position, the bearing part of the plunger being placed substantially in the middle of the free length of the plunger when the safety valve is in the open position.

In the open position and in the closed position of the front orifice, the forward valve cooperates with the body or with an element secured to the body with a radial play that is smaller than a radial play between the body, respectively the element secured to the body, and the forward valve in an intermediate position of the forward valve between the closed position and the open position of the front orifice.

The coupling element includes a rear part arranged in the rear chamber and radially guiding the main valve, the rear part forming a rear stop to the movement of the main valve in the body.

The forward valve is able to come into contact with the plunger only in a direction parallel to the longitudinal axis.

The bearing part is a part separate from the plunger that is kept abutting against the plunger by the second spring.

According to another aspect, the invention also relates to a coupling device including a male coupling element and a female coupling element with complementary shapes and able to fit in one another to guarantee a fluid connection of an inner pipe of the male element with an inner pipe of the female element, at least one of the male and female coupling devices being as previously described, and the sum of:
the distance along the longitudinal axis between the forward valve in the closed position of the front orifice and the plunger in the forward position, and
the distance along the longitudinal axis between the plunger in the forward position and the safety valve in the closed position,
is greater than the opening travel of the forward valve for the fluid communication between the inner pipe of the male element and the inner pipe of female element.

BRIEF DESCRIPTION OF THE SEVERAL VIEWS OF THE DRAWINGS

The invention will be better understood and other advantages thereof will appear more clearly in light of the following description of one embodiment of a coupling element provided solely as a non-limiting example and done in reference to the appended drawings, in which:

FIG. 1 is a schematic illustration, in longitudinal sectional view, of a male coupling element according to a first embodiment of the invention;

FIG. 2 is a schematic illustration of a cross-sectional view of the coupling element of FIG. 1 in plane II-II;

FIG. 3 is an enlarged view of zone III of FIG. 1;

DETAILED DESCRIPTION OF THE INVENTION

Figure 4:
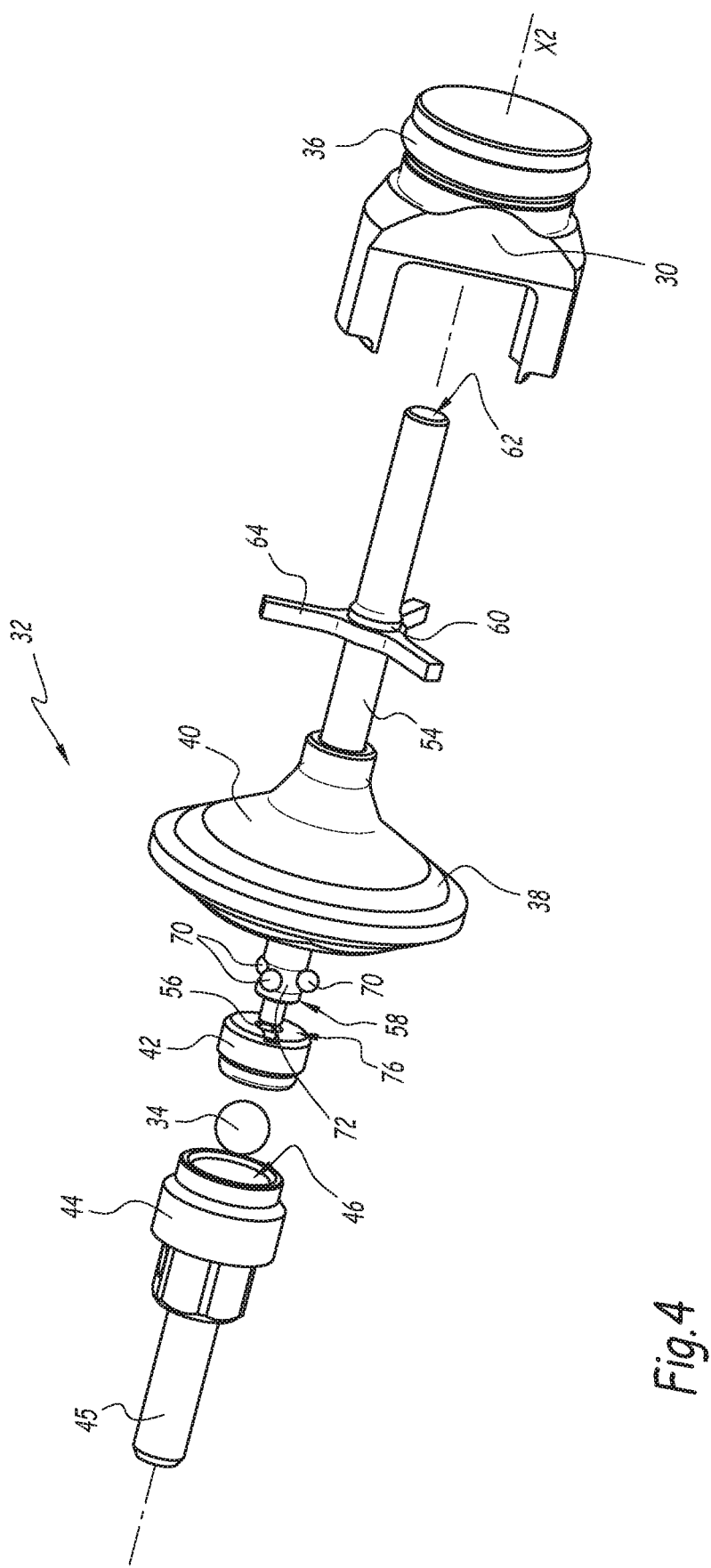
FIG. 4 is a schematic illustration of an exploded view of a portion of the coupling element of FIG. 1.

FIGS. 1 to 8 show a first embodiment of the invention, in which a male fluid coupling element 2 is suitable for being coupled by fitting in a female fluid coupling element 4 to form a coupling device 6 allowing the circulation of a fluid.

The coupling device 6 thus allows tight and reversible coupling of two systems such as pipes or reservoirs, to allow the circulation of a fluid, in particular a pressurized fluid, such as oil.

As illustrated in FIG. 1, the male element 2 includes a male body 8 including a front part 10, an intermediate part 12 and a rear part 14 interleaved with one another tightly. The sealing gasket 11 is inserted between the parts 10 and 12, while a sealing gasket 13 is inserted between the parts 12 and 14.

The male body 8 delimits an inner pipe 16 that extends between a front orifice 18, or front opening, and a rear orifice 20, or rear opening.

In the illustrated example, the front part 10 includes an outer peripheral locking groove 22 that is part of a locking device described in more detail hereinafter.

The front 10, intermediate 12 and rear 14 parts are aligned coaxially along a longitudinal axis X2 of the male element 2. The male body 8 advantageously has an axial symmetry of revolution around the longitudinal axis X2. For example, the male element 2 has an essentially tubular shape extending along the longitudinal axis X2.

The inner pipe 16 includes a rear chamber 24 and an intermediate chamber 26. The rear chamber 24 extends between the rear orifice 20 and the intermediate chamber 26. The intermediate chamber 26 extends between the rear chamber 24 and the front orifice 18. The rear chamber 24 here contains a pressurized fluid. For example, the element 2 is connected by its rear orifice 20 to a pipe or to a pressurized fluid reservoir, which is not illustrated.

Within the meaning of the present description, the qualifier "front" of a coupling element designates the end of said coupling element that faces a complementary coupling element at the beginning of coupling of said two coupling elements. In a coupling element, a part is "forwardly abutting" against another part when the part comes into contact with the other part in a direction oriented toward the front of the coupling element. The qualifier "rear" designates the end of said coupling element that is opposite the front. In a coupling element, a part is "rearwardly abutting" against another part when the part comes into contact with the other part in a direction oriented toward the rear of the coupling element. In the illustrative example of FIG. 2, the pressurized fluid is provided to flow from upstream to downstream from the rear toward the front of the element 2. This circulation direction can be reversed depending on the application.

The male element 2 also comprises a forward valve 30, a main valve 32 and a safety valve 34, which are arranged inside the body 8.

The forward valve 30 is in the form of a part of revolution around the longitudinal axis X2. The forward valve 30 is translatable relative to the male body 8 in the intermediate chamber 26 along the longitudinal axis X2 between a closed position of the front orifice 18 and an open position of the front orifice 18. In the illustrated example, a sealing gasket 36, for example in the form of an O-ring, is inserted radially between the front valve 30 and the male body 8 when the front valve 30 is in its closed position, which makes it possible to close the inner pipe 16. For example, the gasket 36 is received in a peripheral groove of the forward valve 30. The gasket 36 here is made from an elastomeric material.

The front face of the forward valve 30 and the front face of the male body 8 are aligned with one another when the forward valve 30 is in the closed position and the male element 2 is uncoupled.

Within the meaning of the present description, the term "radially" is defined relative to the longitudinal axis X2. Thus, a so-called radial direction is perpendicular to the axis X2. The terms "longitudinal" and "axial" are defined relative to the longitudinal axis X2. Thus, a so-called longitudinal or axial direction is parallel to the longitudinal axis X2.

The forward valve 32 is translatable relative to the male body 8 in the rear chamber 24 along the axis X2 between a closed position and an open position. In the closed position, the main valve 32 closes the rear chamber 24 to the front by abutting axially against the body 8.

The forward valve 32 here includes a sealing gasket 38, for example ring-shaped, that abuts forwardly against a seat 39 formed by the male body 8 when the main valve 32 is in its closed position. For example, when the valves 30 and 32 are each in the closed position, they close the intermediate chamber 26 and isolate it from the rear chamber 24. The gasket 38 here is made from an elastomeric material.

In the open position, the main valve 32 is in a withdrawn position relative to its closed position and a main fluid passage 37 is arranged between the seat 39 and the main valve 32, around the main valve 32, for the fluid communication between the rear chamber 24 and the intermediate chamber 26.

According to preferred embodiments, as illustrated in FIG. 4, the main valve 32 includes a central body 40, an intermediate body 42 and a rear body 44 aligned along the axis X2.

In the illustrated example, the sealing gasket 38 is received in the main body 40. The rear body 44 is screwed into the main body 40. Likewise, the intermediate body 42 is screwed abutting against the rear body 44.

The main body 40 is pierced longitudinally all the way through in order to form a central passage that, when the main valve 32 is mounted inside the male body 4, extends along the longitudinal axis X2 while emerging on the front of the main valve 32 in the intermediate chamber 26 on the one hand, and in a corresponding central passage of the intermediate body 42 and the rear body 44 on the other hand, this second central passage emerging radially in the rear chamber 24 at the rear body 44. These various central passages collectively form a secondary passage 46 arranged through the main valve 32 between the rear chamber 24 and the intermediate chamber 26.

According to other variants, the main valve 32 can be in a single piece.

The safety valve 34 is housed inside the main valve 32. The safety valve 34 is translatable relative to the main valve 32 along the longitudinal axis X2 between a closed position and an open position. In the closed position, the safety valve 34 closes the secondary passage 46 between the rear chamber 24 and the intermediate chamber 26 while abutting forwardly against a seat 48 formed by a sealing gasket mounted on the intermediate body 42 of the main valve 32. In its open position, the safety valve 34 opens this secondary passage 46.

The gaskets 38 and 48 are contact gaskets, i.e., they cooperate axially with the seat 39, the safety valve 34, respectively, when the safety and main valves are in the closed position, in order to limit the friction, as opposed to radial cooperation gaskets like the gasket 36.

In this example, the safety valve 34 is housed inside the secondary passage 46 in order to open or close the secondary passage 46 depending on whether it is in its open or closed position. It is therefore understood that the rear chamber 24 and the intermediate chamber 26 can be placed in fluid communication by means of the secondary passage 46 even when the main valve 32 is in the closed position. The sealing diameter of the safety valve 34 at the gasket 48 is smaller than the sealing diameter of the main valve 32 at the gasket 38, in the case at hand more than five times smaller. Thus, the opening force of the safety valve 34 against the pressure from the fluid present in the rear chamber 24 will be lower than the opening force of the main valve 32 against the same pressure from the fluid in the rear chamber 24.

Preferably, the safety valve 34 is a ball made from metal arranged inside the secondary passage 46.

The element 2 includes a spring 50 that pushes the safety valve 34 back into its closed position abutting against the seat 48. For example, the spring 50 is inserted between the safety valve 34 and the rear body 44 of the main valve 32. Preferably, the spring 50 is a helical compression spring mounted coaxially with the axis X2.

The rear body 44 of the main valve 32 here is extended by a rear rod 45 extending along the axis X2. The rear rod 45 is engaged and guided radially in a rear part 52 housed in the rear chamber 24. For example, the rear part 52 is longitudinally blocked in the body 8, i.e., it cannot be translated along the axis X2. The rear part 52 is preferably a star, i.e., a rigid mechanical part including arms, here three, arranged radially in a star shape around a central opening that receives a part of the main valve 32, in the case at hand, here, that receives the rear rod 45 all throughout the movement of the main valve 32 between its closed position and its open position. Furthermore, the rear part 52 forms a rear stop for the main valve 32. Indeed, the main valve 32 in the open position can be driven backward by the fluid flow rate, and the main valve 32 abutting rearwardly against the rear part 52 guarantees a sufficient non-nil fluid passage section around the main valve 32 in the male body 8. The position occupied by the main valve 32 abutting rearwardly against the rear part 52 is shown by the thin line 32' in FIG. 8.

The element 2 also includes a plunger 54 intended to actuate the safety valve 34. The plunger 54 is translatable along the axis X2 relative to the safety valve 34 and relative to the main valve 32. In other words, the plunger 54 is not made in a single piece with the safety valve 34.

In this example, the plunger 54 is housed partially in the main valve 32. For example, the plunger 54 extends in front of the main valve 32 while being received at least partially in the secondary passage 46 of the main body 40 of the main valve 32. The plunger 54 can move relative to the male body 8 between a forward position and a withdrawn position. The plunger 54 actuates the safety valve 34, i.e., it opens it, when it is moved toward its withdrawn position.

The plunger 54 here includes a longilineal body in the form of a rod or solid cylinder that extends along the axis X2 and that advantageously has an axial symmetry of revolution around the longitudinal axis X2. The outer diameter of the plunger 54 is about 3 mm. Preferably, the plunger 54 has three axial surfaces, i.e., three surfaces perpendicular to the axis X2, including a rear face 56, a rear shoulder 58 and an intermediate shoulder 60 that face the back of the element 2. The plunger 54 also includes a front face 62.

The element 2 also includes a washer 64 serving as bearing part for the plunger. In this example, the bearing part 64 is received inside the body 4, specifically inside the intermediate chamber 26. The bearing part 64 can be translated along the axis X2 inside the intermediate chamber 26, while being guided radially by the inner walls of the front part 10.

Hereinafter, bearing part of the plunger is a single-piece part with the plunger or a part mounted on the plunger such that the bearing part is able to abut forwardly against the plunger.

The bearing part 64 preferably includes a central opening through which the plunger 54 passes. According to embodiments, the bearing part 64 is a star including three branches extending radially around the central opening inside which the plunger 54 is received. Preferably, the bearing part 64 is arranged behind the intermediate shoulder 60 of the plunger 54. It is therefore understood that the bearing part 64 is not blocked in rearward translation along the plunger 54 between the intermediate shoulder 60 and the main body 40.

The body 2 also includes a spring 66 that pushes back and maintains the bearing part 64 in the forward direction against the intermediate shoulder 60. This spring 66 bears rearwardly on the body 4 and bears forwardly on the part 64. Thus, the spring 66 pushes the plunger 54 back toward its forward position when it abuts against the main valve 32. For example, the spring 66 is a helical compression spring mounted coaxially with the axis X2.

As illustrated in FIG. 2, in this example, the axial abutment between the plunger 54 and the main valve 32 is guaranteed by one or several abutment balls 70, in the case at hand three balls 70, housed in a peripheral groove 72 of the plunger 54. The peripheral groove 72 has a circular shape that extends over the outer periphery of the plunger 54 around the axis X2. Thus, the balls 70 are secured in translation with the plunger 54. Each ball 70 is also engaged with a longitudinal slot 74 borne by the main valve 32, here formed the surface delimiting the secondary passage 46 in the main body 40. The longitudinal slots 74 extend parallel to the axis X2, are open on the rear and are closed to the front, i.e., they include an end wall or surface forming a stop preventing the ball 70 from moving further forward in the longitudinal slot 74 along the axis X2.

Alternatively, the stop of the plunger 54 against the main valve 32 can be formed differently.

When the plunger 54 moves forward and reaches its forward position, the balls 70 abut against the end surface of the longitudinal slots 74 and limit the forward movement of the plunger 54 relative to the male body 8 and relative to the main valve 32. In the forward position, the plunger 54 therefore abuts forwardly against the main valve 32. The rear face 56 of the plunger 54 is then at a non-nil distance D2 from the safety valve 34, the safety valve 34 being in its closed position. The rear shoulder 58 of the body of the plunger 54 is then at a non-nil distance D1 from a front face 76 of the intermediate body 42. The distance D3 corresponds to the distance between the front face 62 of the plunger 54 and a rear face of the front valve 30 when the plunger 54 is in the forward position, and the front valve 30 and the main valve 32 are closed. The distance D3 is non-nil. The distances D1, D2 and D3 are taken along the longitudinal axis X2.

Part of the plunger 54 is arranged with a reduced play inside the main body 40 in order to guarantee radial guiding of the plunger 54 relative to the main valve 32.

Figure 8:
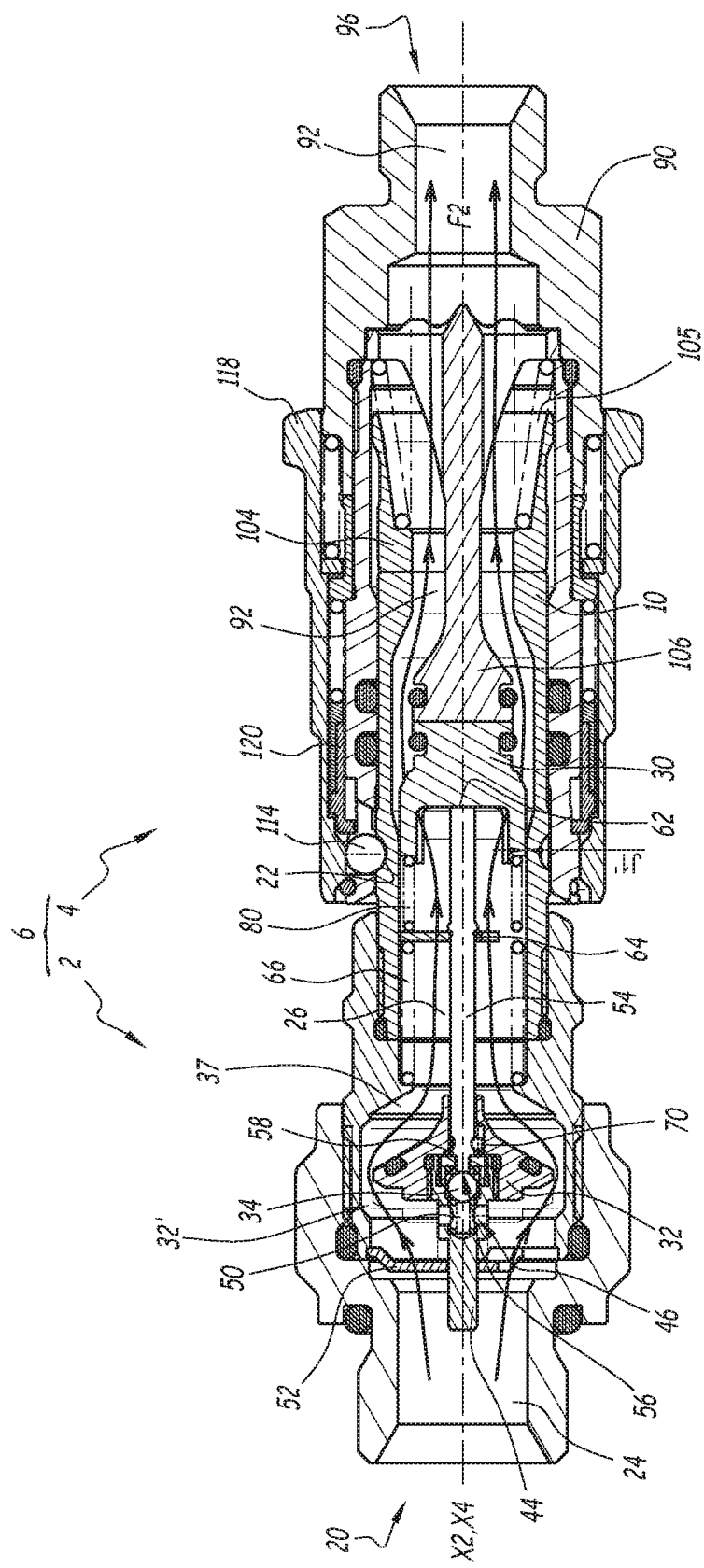
FIG. 8 is a schematic illustration of the male and female coupling elements of FIGS. 6 and 7 coupled to one another.

As illustrated in FIG. 8, the length "L1" represents the free length of the plunger 54, measured along the axis X2 from the front face of the main body 40 to the front face 62 of the plunger 54 in the configuration where the safety valve is open. The length "L2" represents the distance, measured along the axis X2, between the front face of the main body 40 and a midplane P64 of the bearing part 64 in this same configuration. In the illustrated configuration, the length L2 is equal to half of the length L1, preferably equal to 0.4 to 0.6 times the length L1. In other words, the bearing part 64 is substantially placed at the middle of the free length L1 of the plunger 54 when the safety valve 34 is in the open position. This makes it possible to limit the buckling of the plunger 54 even if the section of the plunger 54 is small.

Returning to FIG. 1, the element 2 also includes a spring 80 that pushes the forward valve 30 back toward its closed position. For example, the spring 80 is inserted between the forward valve 30 and the bearing part 64, while bearing on a face of the bearing part 64 that is oriented away from the bearing face of the spring 66. The spring 80 here is a helical compression spring arranged coaxially with the axis X2.

Preferably, the turns of the springs 66 and 80 are aligned along the axis X2, which increases the radial compactness of the male element 2. The turns of the springs 66 and 80 here are arranged in the outer radial position in the intermediate chamber 26, which makes it possible for their operation not to be hindered when the fluid circulates around the plunger 54.

Advantageously, the maximum return force developed by the spring 80 during the movement of the forward valve 30 relative to the male body 8 is strictly less than the minimum return force developed by the spring 66 during the movement of the plunger 54 relative to the male body 8. The return force developed by the spring 80 is at its maximum in the coupled configuration, when the forward valve 30 and the main valve 32 are both in the open position. This maximum force is also reached when the forward valve 30 is in contact with the plunger 54. The minimum return force developed by the spring 66 is reached when the plunger is in the forward position. In particular, the spring 66 has a stiffness greater than that of the spring 80, so as to be able to exert a return force greater than that of the spring 80.

It will therefore be understood that in practice, the coupling element 2 is arranged such that, during coupling with a complementary coupling element 4 during which the forward valve 30 is moved toward its open position, the forward valve 30 comes into contact with the plunger 54 and moves the plunger 54. The plunger 54 next comes into contact with the safety valve 34 and moves it into the open position of the secondary passage 46 before coming into contact with the main valve 32 and moving it into the open position. The coupling element 2 is arranged such that, during coupling with a complementary coupling element 4, the plunger 54 or the safety valve 34 comes into contact with the main valve 32 to move the main valve 32 from its closed position toward its open position.

The plunger 54 and the main valve 32 are arranged to interact with one another such that the movement of the plunger 54 toward the forward position drives the movement of the main valve 32 toward its closed position.

An example assembly method of the element 2 is now briefly described as an illustration and not necessarily limitingly.

First, the assembly formed by the plunger 54 and the main valve 32 is assembled by sliding the bearing part 64 from the rear of the plunger 54, then engaging the main body 40 of the main valve 32 around the plunger 54. The balls 70 are next engaged in the peripheral groove 72, then in the longitudinal slots 74 of the main valve 32. The safety valve 34 and the spring 50 acting on this safety valve 34 are next engaged in the rear body 44.

The intermediate body 42 is next screwed abutting rearwardly against the rear body 44. The subassembly formed by the rear body 44 and the intermediate body 42 is next screwed abutting forwardly against the main body 40, with insertion of a sealing gasket 82. The rear part 52 and the assembly formed by the plunger 54 and the main valve 32 are next placed inside the front part 14 of the male body 8, then the intermediate part 12 is screwed on the rear part 14.

Next, the spring 66 is engaged between the intermediate part 12 and the front bearing part 64, then the spring 80 is placed around the plunger 54 in front of the bearing part 64. The front part 10, after having been equipped with the front valve 30, is next screwed in the intermediate part 12. The male element 2 is then in its assembled configuration.

Figure 5:
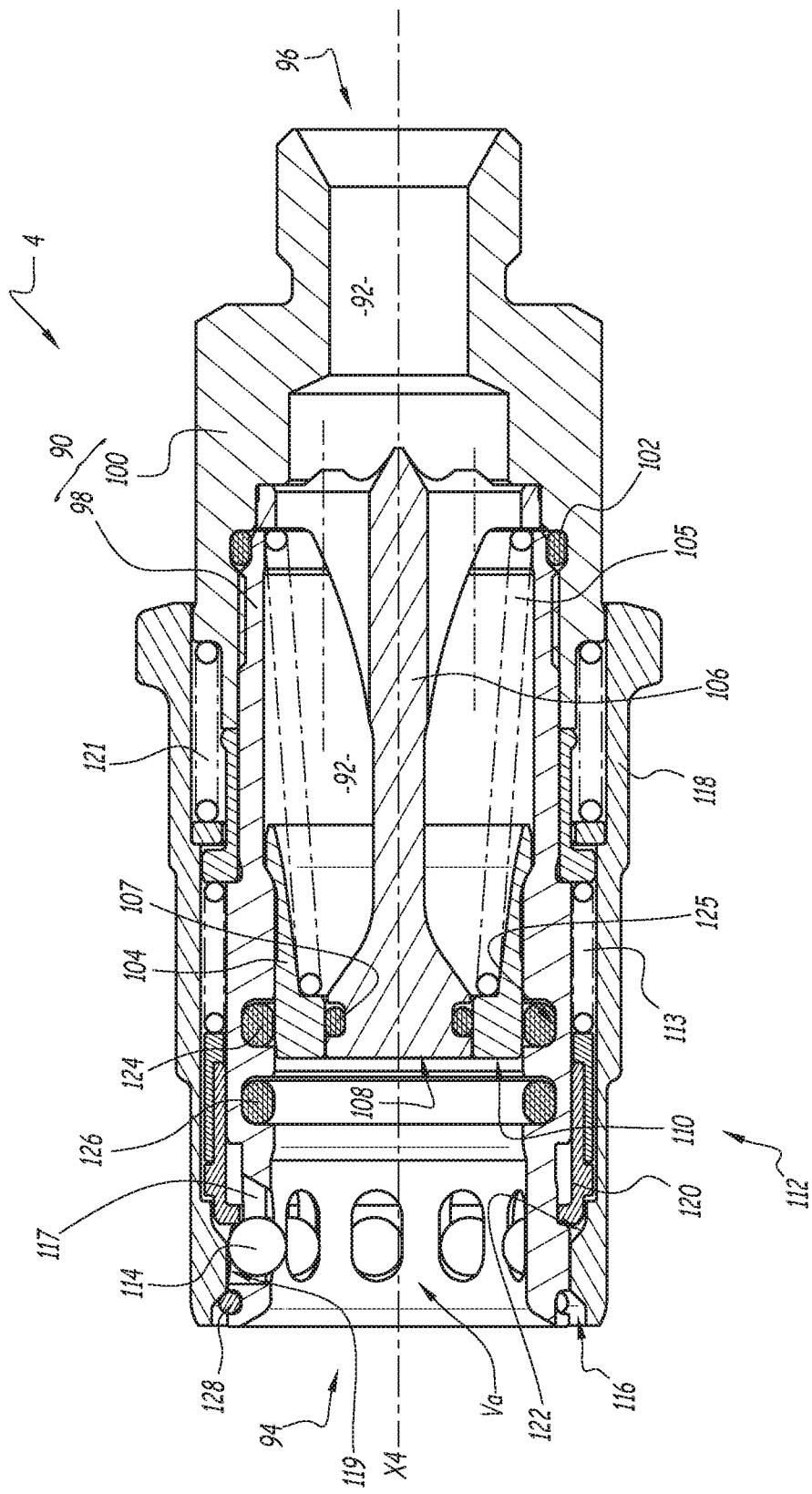
FIG. 5 is a schematic illustration of a female coupling element suitable for being coupled with the coupling element of FIG. 1.

FIG. 5 shows an example of the female coupling element 4.

The female element 4 includes a female body 90 delimiting an inner pipe 92 that extends between a front orifice 94 and a rear orifice 96. Reference X4 denotes a longitudinal axis of the female body 90. For example, the female body 90 has an essentially tubular elongated shape centered along the longitudinal axis X4. When the female element 4 is in a configuration coupled with the male element 2, the axis X4 is combined with the axis X2.

The front orifice 94 is intended to be associated with the front orifice 18 of the element 2 in order to allow the circulation of the fluid from the element 2 toward the element 4.

The female body 90 here includes a front part 98 and a rear part 100 that are screwed to one another tightly using a sealing gasket 102.

The element 4 further includes a slide valve 104 and a piston 106. The slide valve 104 is translatable along the axis X4 relative to the female body 90 between a closed position and an open position of the inner pipe 92. The piston 106 is in turn stationary relative to the body 90 while being sandwiched between the front part 98 and the rear part 100. A spring 105 pushes the slide valve 104 back toward its closed position. For example, the spring 105 is a helical compression spring coaxial with the axis X4, inserted between the back of the slide valve 104 and a base of the piston 106.

In the closed position, the slide valve 104 cooperates tightly with the female body 90 via a sealing gasket 124 housed in an inner peripheral groove 125 of the female body 90 and with the piston 106 via a sealing gasket 107 housed in an outer peripheral groove of the piston 106.

The front face 108 of the piston and the front face 110 of the slide valve 104 are aligned with one another when the slide valve 104 is in the closed position and the female element 4 is uncoupled.

The female body 90, the front face 108 of the piston 106 and the front face 110 of the slide valve 104 delimit, in the uncoupled configuration, a volume Va for receiving the male element 2 in the female body 90.

A sealing gasket 126 is housed in an inner peripheral groove of the female body 90, in the receiving volume Va.

The female element 4 is further equipped with a locking device 112 intended to lock the element 4 in a coupled configuration with the element 2. The locking device 112 here is able to cooperate with the locking groove 22 arranged on the front part 10 of the element 2.

In this example, the locking device 112 is a ball locking device. Alternatively, the locking device 112 can be made differently. It will therefore be understood that in such a case, the element 2 is adapted accordingly and the locking groove 22 can be replaced by another device complementary to the locking device 112.

Thus, in the illustrated example, the locking device 112 includes locking balls 114, in the case at hand eight, an elongate housing 117 each suitable for receiving one of the locking balls 114 in the female body 90, and also includes a locking ring 118 and an inner ring 120 that cooperates with an inner spring 113 inserted between a stop ring of the female body 90 and the inner ring 120. The locking ring 118 is suitable for covering the locking balls 114 by an inner radial surface 119 and keeping them in an inner locking position in which they protrude partially into the receiving volume Va. The inner ring 120 is suitable for axially delimiting the longitudinal position of the locking balls 114 in their elongate housing 117. The inner ring 120 is translatable relative to the female body 90. The inner ring 120 and the locking ring 118 are mounted coaxially around the longitudinal axis X4. Reference 122 designates an inner housing of the locking ring 118 at the rear and hollowed in the inner radial surface 119, reference 116 designates an inner housing of the locking ring 118 at the front and hollowed in the inner radial surface 119 and reference 128 designates a stop segment associated with the locking ring 118.

Figure 6:
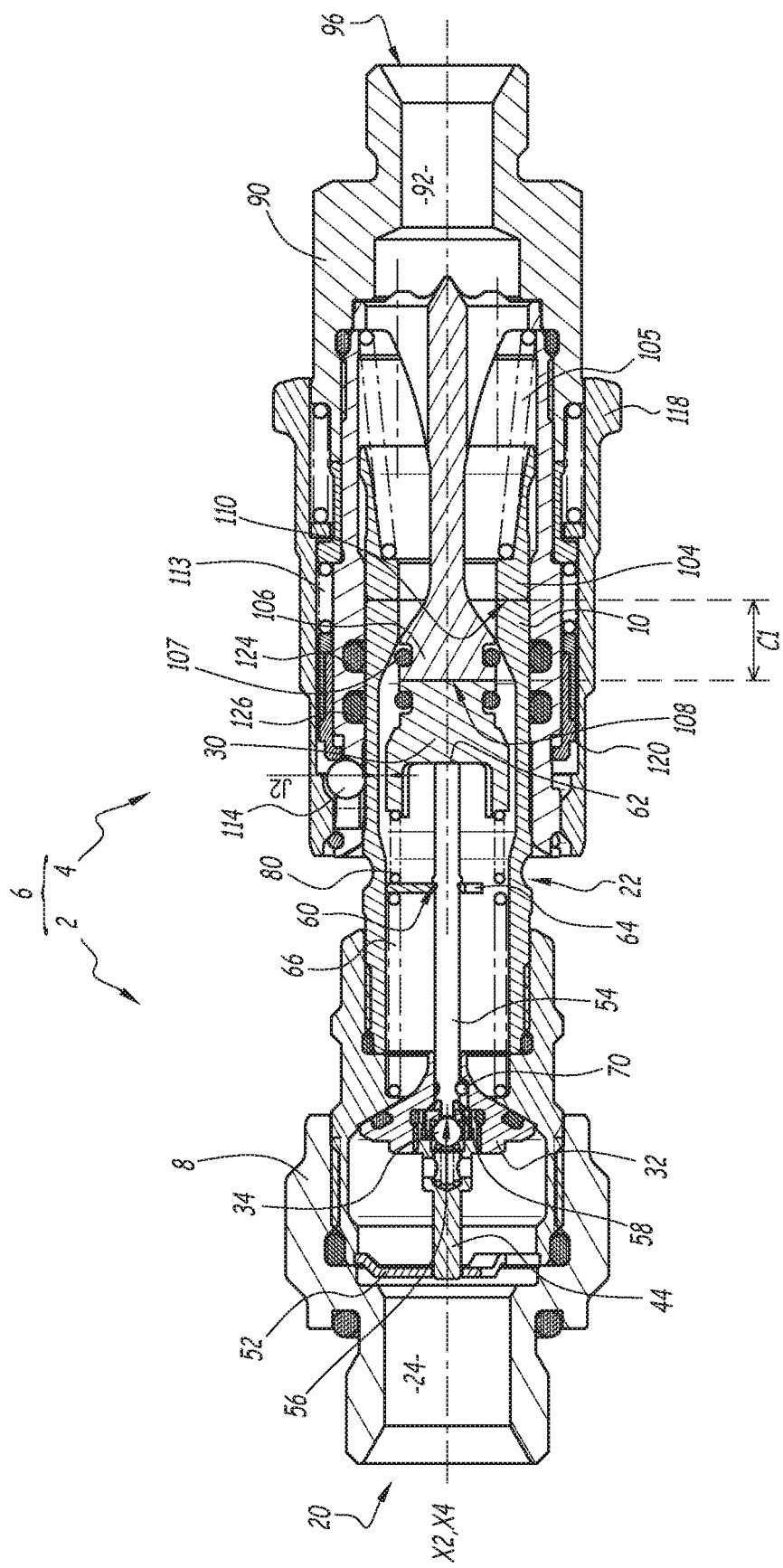
FIGS. 6 and 7 are schematic illustrations of the coupling elements of FIGS. 1 to 5 during different coupling phases.
Figure 7:
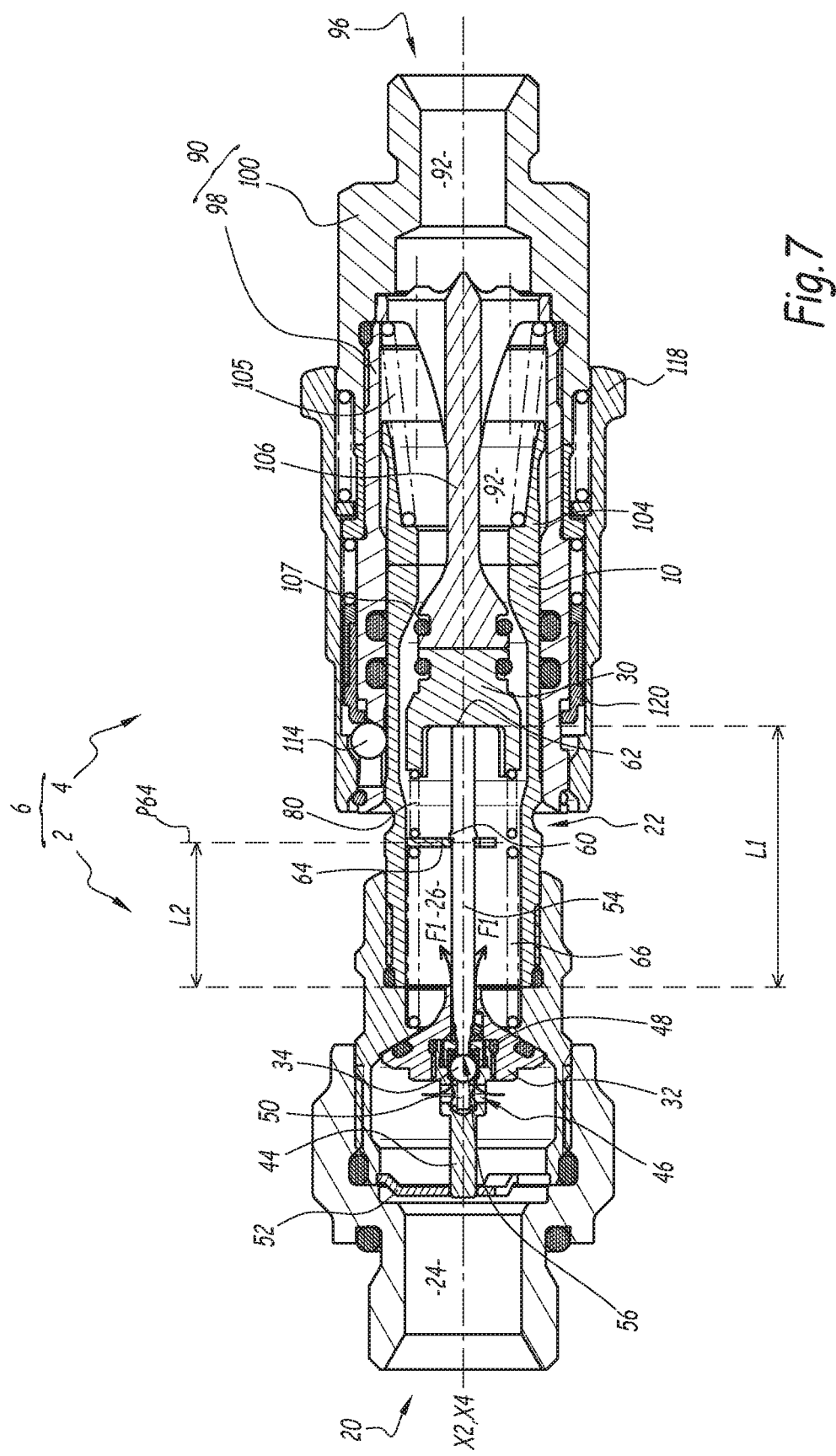

FIGS. 6 to 8 show the coupling device 6 formed by the assembly of the male 2 and female 4 coupling elements. An example of a coupling sequence for coupling the male and female elements 2 and 4 is now described. The elements 2 and 4 are illustrated during coupling in FIGS. 6 and 7, while they are coupled in FIG. 8.

First, the elements 2 and 4 are aligned such that their respective axes X2 and X4 coincide and their respective front orifices 18 and 94 face one another. Then, the elements 2 and 4 are fitted in one another. The element 2 is inserted into the receiving volume Va.

The front face of the forward valve 30 comes into contact with the front face 108 of the piston 106. At the same time, the front face of the front part 10 comes into contact with the front face 110 of the slide valve 104, since, in the closed position of the slide valve, the front face 110 is aligned with the front face 108 of the stationary piston 106.

The female body 90 at least partially surrounds the male body 8, here at the front part 10 of the male body 8. For example, the front face of the male body 8 comes into contact with the locking balls 114 and pushes them back toward the rear in the elongate housing 117, causing a withdrawal movement of the inner rings 120, then radially in the rear inner housing 122. The inner ring 120 is pushed back toward its retracted position, while the locking ring 118 remains in the forward position, since it is pushed back by a spring 121 mounted below the locking ring 118 until it abuts against the stop segment 124.

The male body 8 continues its movement until tightness is guaranteed by the sealing gaskets 124 and 126, which make contact and surround the front part 10. Under the action of the front part 10, the slide valve 104 is pushed backward toward its open position, such that the front faces 108 and 110 are no longer aligned, as illustrated in FIG. 6. Thus, the gasket 107 carried by the piston 106 is no longer in contact with the slide valve 104, such that the inner pipe 92 is placed in communication with the intermediate chamber 26. At this stage, however, the fluid does not leave the rear chamber 24, since the valves 32 and 34 are closed.

Reference "C1" corresponds to the opening travel of the male/female communication, i.e., the minimum value of the movement along the axis X2 of the forward valve 30 from its closed position, when it is moved as described above upon coupling, to allow the gasket 107 of the piston 106 to leave the tight contact with the male body 8 and to place the intermediate chamber 26 in communication with the inner pipe 92.

As will be seen hereinafter, the travel of the forward valve 30 to open the safety valve 34 from the uncoupled configuration is greater than the opening travel C1 of the male/female communication.

In parallel with this movement, the forward valve 30 is pushed back toward the rear of the male element 2 until it comes into direct contact with the front face 62 of the plunger 54. The forward valve 30 is pushed back toward its open position while opposing the return force exerted by the spring 80.

Nevertheless, during this withdrawal of the forward valve 30, the plunger 54 remains in its forward position forwardly abutting against the main valve 32, due to the fact that the force exerted by the spring 66 is greater than the force exerted by the spring 80.

As the movement continues, the forward valve 30 abutting on the forward base 62 of the plunger 54 causes the plunger 54 to withdraw toward its withdrawn position. In so doing, the plunger 54 overcomes the return force exerted by the spring 66. The spring 80 remains compressed, but is not further compressed during the withdrawal movement of the plunger 54, since the bearing part 64 accompanies the withdrawal movement of the plunger 54. Indeed, the intermediate shoulder 60 bears on the part 64, which translates the bearing part 64 along the axis X2.

In this configuration, the plunger 54 at this stage has not yet made contact with the safety valve 34, such that the safety valve 34 and the main valve 32 are both in their closed position. Thus, the fluid contained in the rear chamber 24 cannot, at this stage, penetrate the intermediate chamber 26.

The plunger 54 next comes into contact with the safety valve 34. Specifically, the rear face 56 of the plunger 54 bears on the safety valve 34, i.e., here bears on the ball forming the safety valve 34. The safety valve 34 withdraws with the plunger 54 under the effect of this bearing while opposing the return force exerted by the spring 50.

As illustrated in FIG. 7, the safety valve 34 leaves its seat and opens the secondary passage 46, of smaller size, between the intermediate chamber 26 and the rear chamber 24. A small fluid flow rate can flow from the rear chamber 24 toward the intermediate chamber 26 via the secondary passage 46, as illustrated by the arrows F1. At this stage, the elements 2 and 4 are still undergoing coupling. Since the fluid communication is open between the inner pipe 92 and the chamber 26, this fluid can flow toward the inner pipe 92, which makes it possible to decrease the pressure of the fluid in the rear chamber 24.

The fitting movement continues and the rear shoulder 58 of the plunger 54 abuts against the front face 76 of the intermediate body 42. Under the effect of this bearing and the fitting movement, the main valve 32 is pushed back toward its open position. In other words, the movement of the plunger 54 toward the withdrawn position drives the movement of the main valve 32 toward its open position. In this example, the plunger 54 bears directly on the main valve 32 and the spring 50 is not further compressed.

As illustrated in FIG. 8, once the main valve 32 is in its open position, with the plunger in the withdrawn position, a main fluid passage 37 is arranged between the main valve 32 and the male body 8 allowing a stream F2 of fluid, greater than the stream F1, to circulate between the rear chamber 24 and the intermediate chamber 26. Thus, the fluid circulates toward the inner pipe 92 of the female element 4.

At this stage, the locking device 112 engages to lock the elements 2 and 4 in the coupled state. The fitting movement can no longer be continued. Furthermore, the elements 2 and 4 cannot be coupled to one another without first releasing the locking device 112.

In the illustrated example, the fitting movement ends when the locking balls 114 arrive opposite the locking groove 22 of the male body 8 and engage therein in the inner locking position. The inner ring 120 of the female element 4 is pushed back in the forward position by the spring 113, such that the locking balls 114 are pushed back toward the front in the elongate housing 117 in a position where they are radially covered by the inner radial surface 119 of the locking ring 118.

The coupling is automatic, since only the approach movement of the male 8 and female 90 bodies allows the locking device 112 to reach its locked configuration with the locking balls 114 kept engaged in the locking groove 22.

The main valve 32 is open and the elements 2, 4 are coupled. Thus, preferably, the sum of the movement travel of the forward valve from its closed position relative to the plunger in the forward position (distance D3) and the travel of the plunger from its forward position relative to the safety valve (distance D2) in the closed position is greater than the opening travel C1.

Once in the coupled configuration, the forward valve 30 here regains a radial guiding with the body 8, by cooperating with reduced radial play with the inner walls of the inner pipe 16, guiding that it had lost after leaving its closed position, due to a local widening of the inner pipe 16 at the front part 10. In other words, the radial play J1, J1' between the body 8 and the forward valve 30 in its closed position, respectively in its open position, is smaller than the radial play J2 between the forward valve 30 and the body 8 in the configuration of FIG. 7, in which the forward valve 30 is in an intermediate longitudinal position between its closed position and its open position.

At this stage, the locking balls 114 are kept in the inner locking position by the locking ring 118 and oppose the withdrawal movement of the male body 8 outside the female body 90, therefore the separation of the male 8 and female 90 bodies.

In its movement between its forward position and its withdrawn position, the plunger 54 is in contact with the forward valve 30 only along the longitudinal axis X2. The forward valve 30 has no radial contact with the plunger 54. In other words, the forward valve 30 does not radially guide and does not radially constrain the plunger 54.

An example of a method for uncoupling the elements 2 and 4 is now described.

First, the locking ring 118 is manually retracted toward the rear of the female element 4 to allow the inner housing 116 of the locking ring 118 to be radially opposite the locking balls 114, which allows the locking balls 114 to move away radially and no longer to protrude into the receiving volume Va and which makes it possible to move the female body 90 away from the male body 8.

When the female body 90 begins to be moved away from the male body 8, the slide valve 104 returns gradually toward its closed position, under the effect of the spring 105, while the forward valve 30 is pushed back toward its closed position by the spring 66.

In parallel, the spring 50 pushes the safety valve 34 back toward its closed position, which closes the secondary passage 46 and interrupts the circulation of the stream F1 of fluid through the secondary passage 46. The spring 66 guarantees that the plunger 54 returns to abut forwardly against the main valve 32, which drives the main valve 32 toward its closed position. In other words, the movement of the plunger 54 toward its forward position drives the movement of the main valve 32 toward its closed position. This movement here is guaranteed by a direct action of the plunger 54 on the main valve 32 owing to the stop balls 70 and by the spring 66. Once abutting against the valve 32, the plunger 54 no longer moves relative to the body 40 of the valve 32, but the assembly formed by the main valve 32 and the plunger 54 continues to be translated forward in the inner pipe 16 under the action of the spring 66.

At this stage, the intermediate chamber 26 is still in communication with the inner pipe 92. Indeed, since the return force exerted by the spring 80 is weaker than that exerted by the spring 66, the forward valve 30 stays in contact with the plunger 54 while the spring 66 pushes the bearing part 64 back toward the front.

Once the main valve 32 reaches its closed position abutting on the body 8, the plunger 54 can no longer move further forward, since it is already forwardly abutting on the main valve 32. The spring 66 can no longer continue to relax, since the intermediate shoulder 60 prevents the bearing part 64 from going further.

Then, the spring 80 in turn relaxes and pushes the forward valve 30 toward its closed position, since it is not strong enough relative to the spring 66 to push the bearing part 64 toward the rear.

The forward valve 30 leaves the front face 62 of the plunger 54. The forward valve 30 stays in contact with the front face of the piston 106 and, as the female element 4 is removed from the male element 2, the slide valve 104 returns toward its closed position. The forward valve 30 finally regains the tightness with the male body 8 and the slide valve 104 regains the tightness with the female body 90 and with the piston 106.

The intermediate chamber 26 is closed, as is the inner pipe 92. The coupling elements 2 and 4 can be completely separated and are ready for another connection.

In this example, during the uncoupling, between the uncoupled configuration and the configuration in which the plunger 54 forwardly abuts against the main valve 32, the main valve 32 is floating, i.e., it is not subject to any resilient force relative to the male body 8. This guarantees, during uncoupling, that the safety valve 34 will be closed before closing of the main valve 32.

Owing to the invention, the behavior of the safety valve 34 and the main valve 32 follows a predefined sequence during coupling and during uncoupling. In particular, during coupling, the main valve 32 only opens after the safety valve 34, which in turn only opens after the elements 2 and 4 have been fitted and the fluid communication between elements 2 and 4 is guaranteed. On the one hand, this makes it possible to lower the pressure in the rear chamber 24 before the opening of the main valve 32. Similarly, during uncoupling, the safety valve 34 and the main valve 32 are closed before closing the fluid communication between the coupling elements 2 and 4.

Owing to the fact that the springs 66 and 80 bear on the same part 64, it is not necessary to further compress the spring 80 to open the safety valve 34 and the main valve 32. The return force of the spring 80 lower than the return force of the spring 66 guarantees the uncoupling sequence opposite the coupling sequence, or the closing of the main valve 32 and the safety valve 34 before the closing of the fluid communication between the intermediate chamber 26 and inner pipe 92 and the closing of the forward valve 30. This prevents the pressurized fluid leaks in the intermediate chamber 26 during uncoupling, which makes it possible to preserve an intermediate chamber 26 having a lower pressure so as to be able to push the forward valve 30 back easily during a subsequent connection.

Since, during coupling, the forward valve 30 is no longer guided radially by the male body 8 into an intermediate position, in particular when the forward valve 30 comes into contact with the plunger 54 and as long as the main valve 32 is not moved toward its open position, and since the forward valve 30 does not radially guide the plunger 54, jamming risks between the moving parts are avoided.

Other embodiments are possible. In particular, alternatively, components described in reference to the male coupling element may, alternatively, be mounted on a female coupling element and vice versa.

Figure 9:
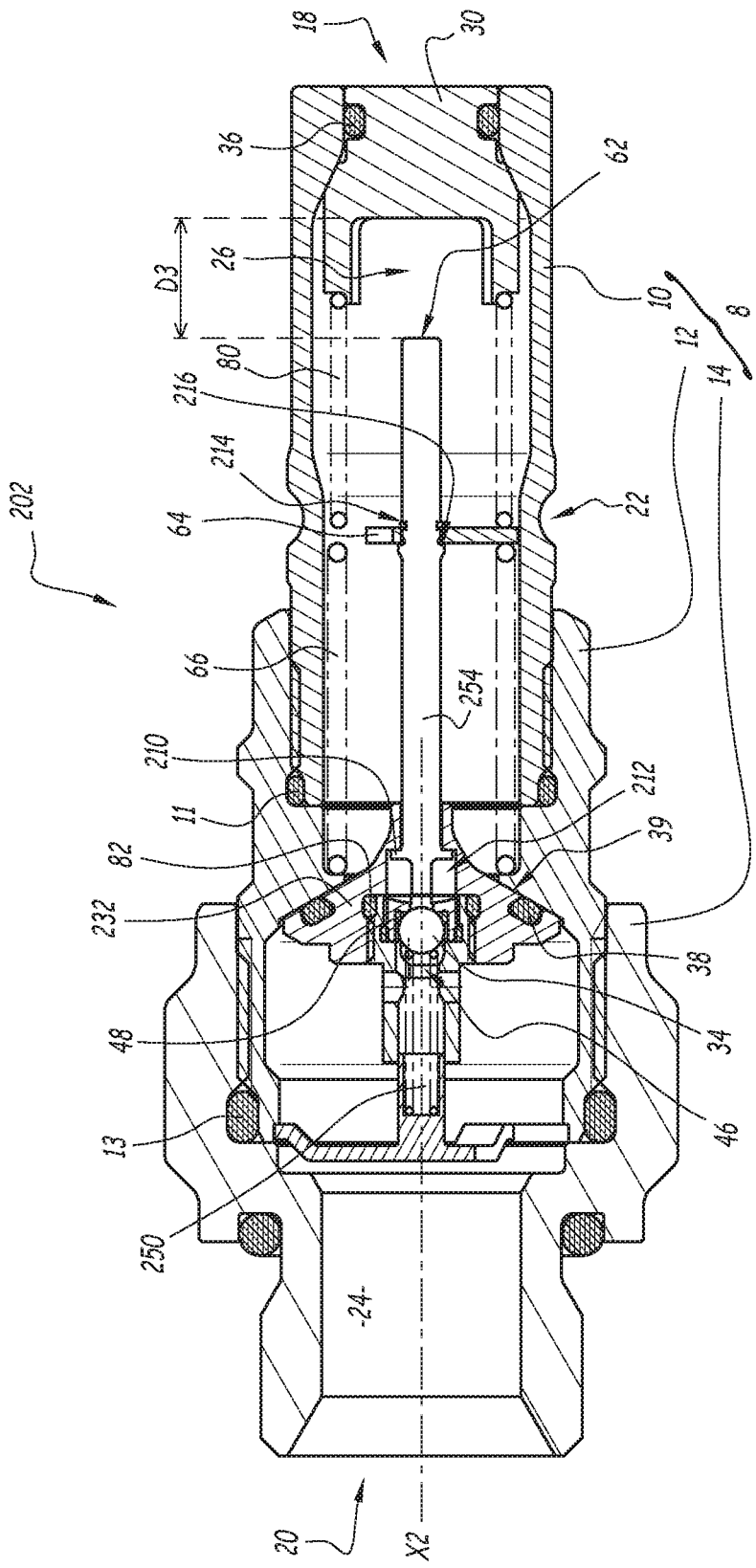
FIG. 9 is a schematic illustration, in longitudinal sectional view, of a male coupling element according to a second embodiment of the invention.
Figure 10:
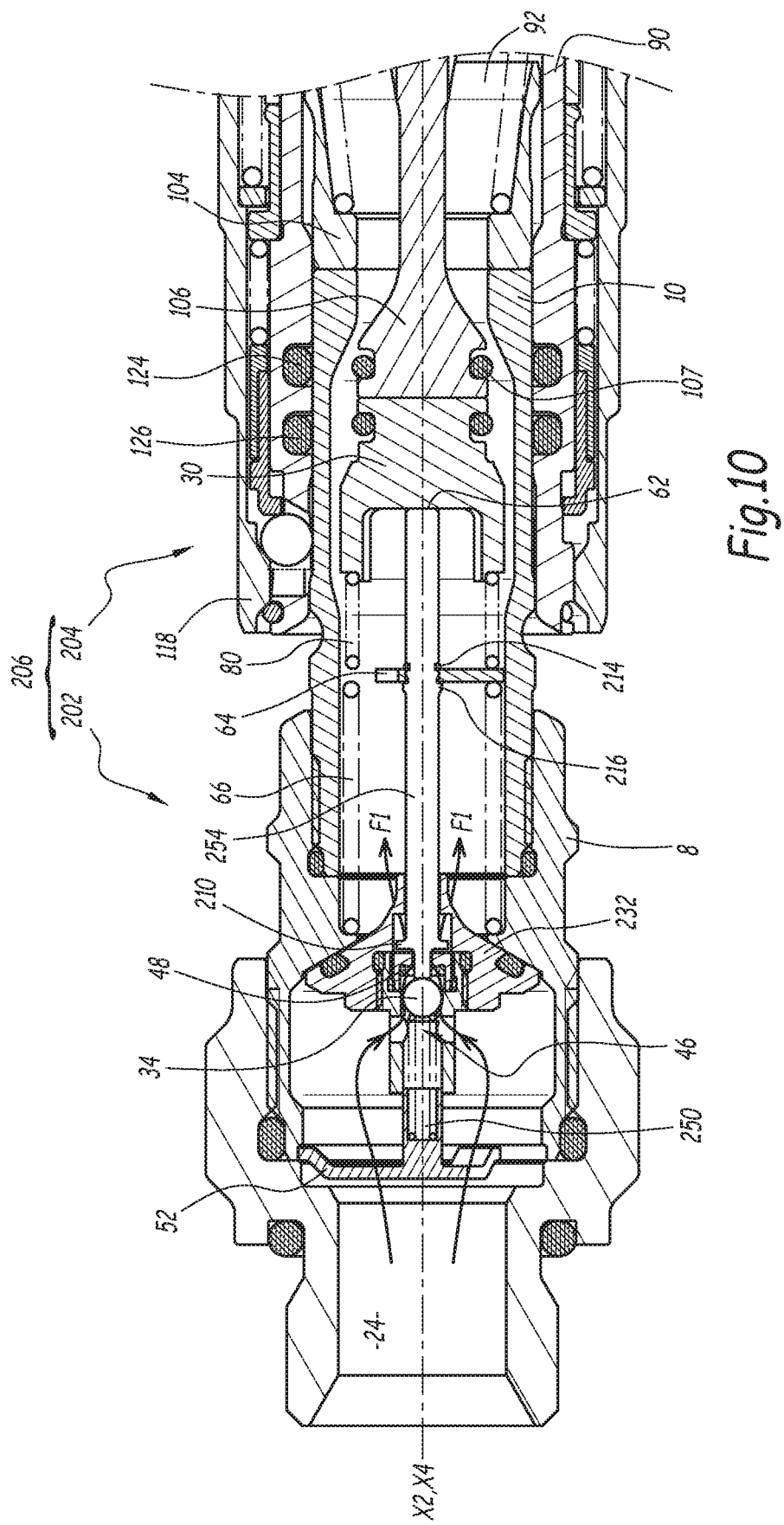
FIG. 10 is a schematic illustration of the coupling element of FIG. 8 during coupling with a complementary coupling element.
Figure 11:
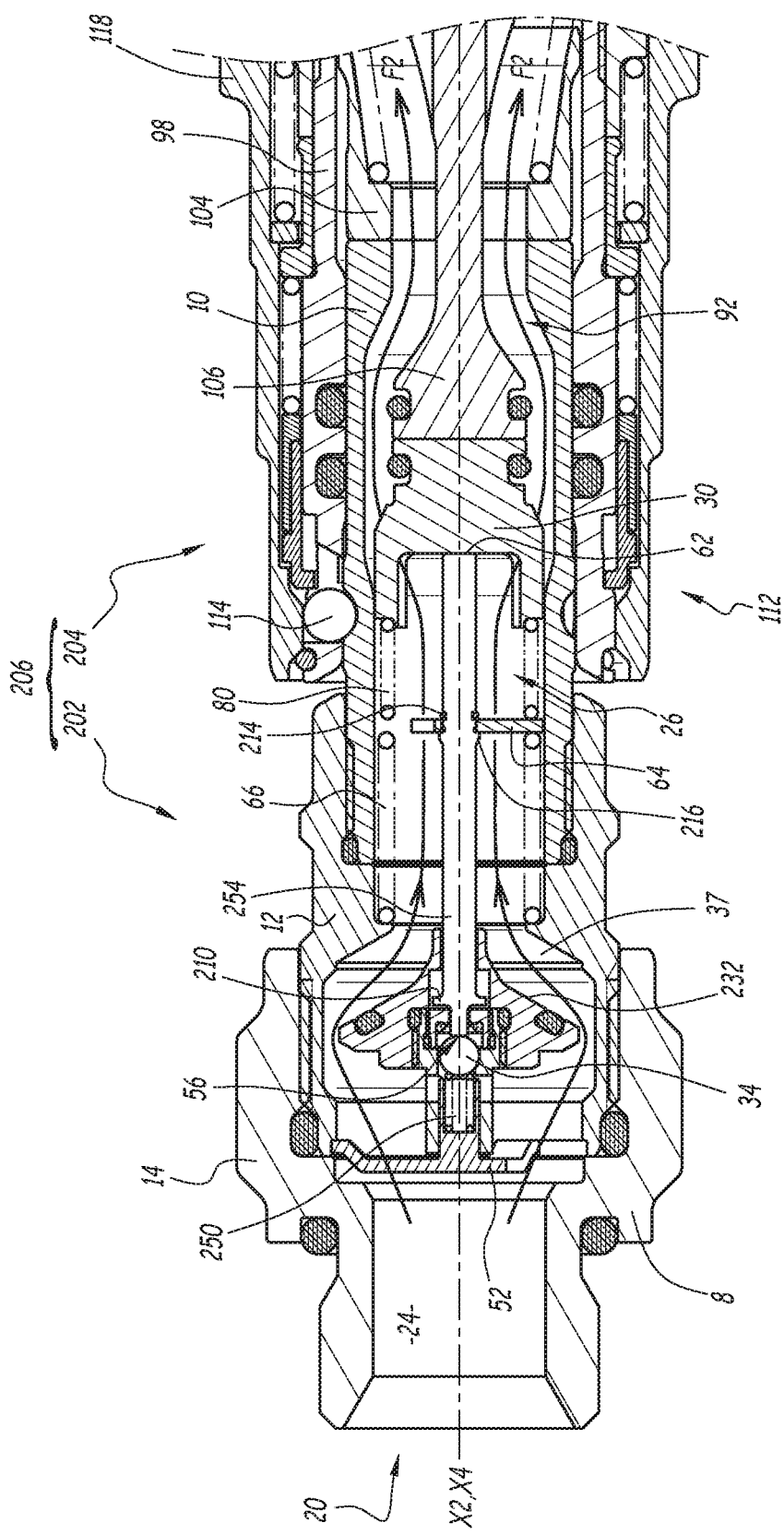
FIG. 11 is a schematic illustration of the coupling elements of FIGS. 9 and 10, in a coupled configuration.

FIGS. 9 to 11 show a second embodiment of the invention, in which a male coupling element 202 is suitable for being coupled by fitting in a female coupling element 204 to form a coupling device 206 allowing the circulation of a fluid.

The coupling elements 202 and 204 here are intended to play a role similar to that of the coupling elements 2 and 4. The components of these coupling elements 202 and 204 that are similar to those of the coupling elements according to the first embodiment previously described bear the same references and are not described in more detail, since the above description can be transposed to them. Only the components with significant differences are described hereinafter.

The coupling element 202 in particular differs from the coupling element 2, in that the stop of the plunger 254 on the main valve 232 is provided by a flange 210 of the plunger 254 bearing on the bottom plane of a spot facing 212 arranged in the main valve 232. In other words, the stop balls 70 are omitted, as are the peripheral groove 72 and the longitudinal slots 74.

The main valve 232 here has the same function as the main valve 32, but has a different shape. In particular, the safety valve 34 is pushed back by a spring 250 similar to the spring 50 but which here is inserted between the safety valve 34 and the rear part 52 secured to the male body 8. Thus, the spring 250 does not bear on the main valve 232.

The rear part 52 cooperates radially with the main valve 232 to guide it while being engaged in the main valve 232 all throughout the movement of the main valve 232 between its closed position and its open position.

The bearing part 64 is kept secured in translation with the plunger 254 while being placed between a stop segment 214 and a shoulder surface 216 secured to the plunger 254. For example, the stop segment 214 is placed in front of the bearing part 64 while the shoulder surface 216 is placed behind the bearing part 64 and faces the front orifice 18. During the assembly, the bearing part 64 is mounted from the front of the plunger 254. The spring 80 here bears between the bearing part 64 and the forward valve 30. The spring 66 here bears between the bearing part 64 and the body 8. According to one variant that is not illustrated, the bearing part 64 can be in a single piece with the plunger 54.

The coupling element 204 in turn is similar to the coupling element 4.

The coupling sequence of the elements 202 and 204 is similar to that previously described for the elements 2 and 4, except that the plunger 254 here indirectly actuates the main valve 232 to open via the safety valve 34. Indeed, during coupling, the forward valve 30 pushes back the plunger 254, the rear face 56 of which pushes back the safety valve 34 and opens the secondary passage 46 between the rear chamber 24 and the intermediate chamber 26. This causes the lowering of the fluid pressure in the chamber 24.

Then, the continued withdrawal of the plunger 254 in the male body 8 causes the safety valve 34 to abut rearwardly against the main valve 232 and the safety valve 34, pushed back by the plunger 254, moves the main valve 232 toward its open position in which a stream F2 of fluid is possible between the rear chamber 24 and the intermediate chamber 26 and the main passage 37 arranged between the male body 8 and the main valve 232. In other words, it is the safety valve 34 that opens the main valve 232. It will therefore be understood that the plunger 254 does not come into contact with the main valve 232 via a shoulder like the rear shoulder 58. When the safety valve 34 abuts rearwardly against the main valve 232, a fluid communication remains possible between the rear chamber 24 and the intermediate chamber 16 at the secondary passage 46 owing to a longitudinal slot formed on the intermediate body 42 at the secondary passage 46. During uncoupling, the plunger 254, under the resilient return force of the spring 66, follows the withdrawal movement of the forward valve 30 toward the closed position, while the contact continues to be maintained between the forward valve 30 and the front face 62 of the plunger 254. The spring 250 pushes the safety valve 34 back on its seat, while the main valve 32 stays open. Then, the plunger 254, still resiliently pushed back toward the front by the spring 66, abuts against the main valve 232 owing to the flange 210 and returns it toward the closed position.

For the first and second embodiments, automatic ball locking has been guaranteed owing to the locking device 112. It would also instead be possible to provide bayonet-type locking, locking with needles or locking with fingers, which may or may not be automatic.

Figure 12:
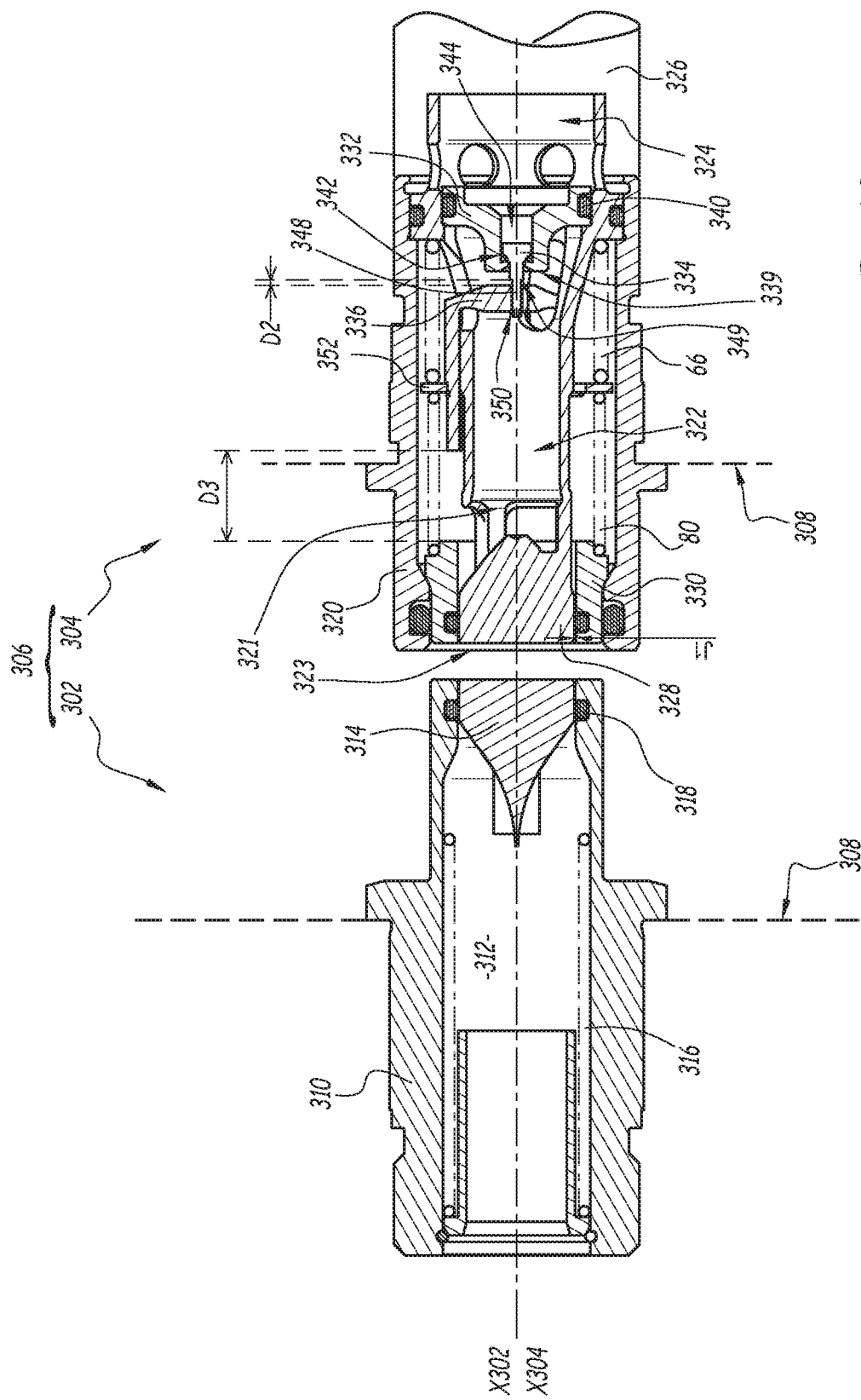
FIG. 12 is a schematic illustration of a coupling device comprising male and female coupling elements according to a third embodiment of the invention.
Figure 13:
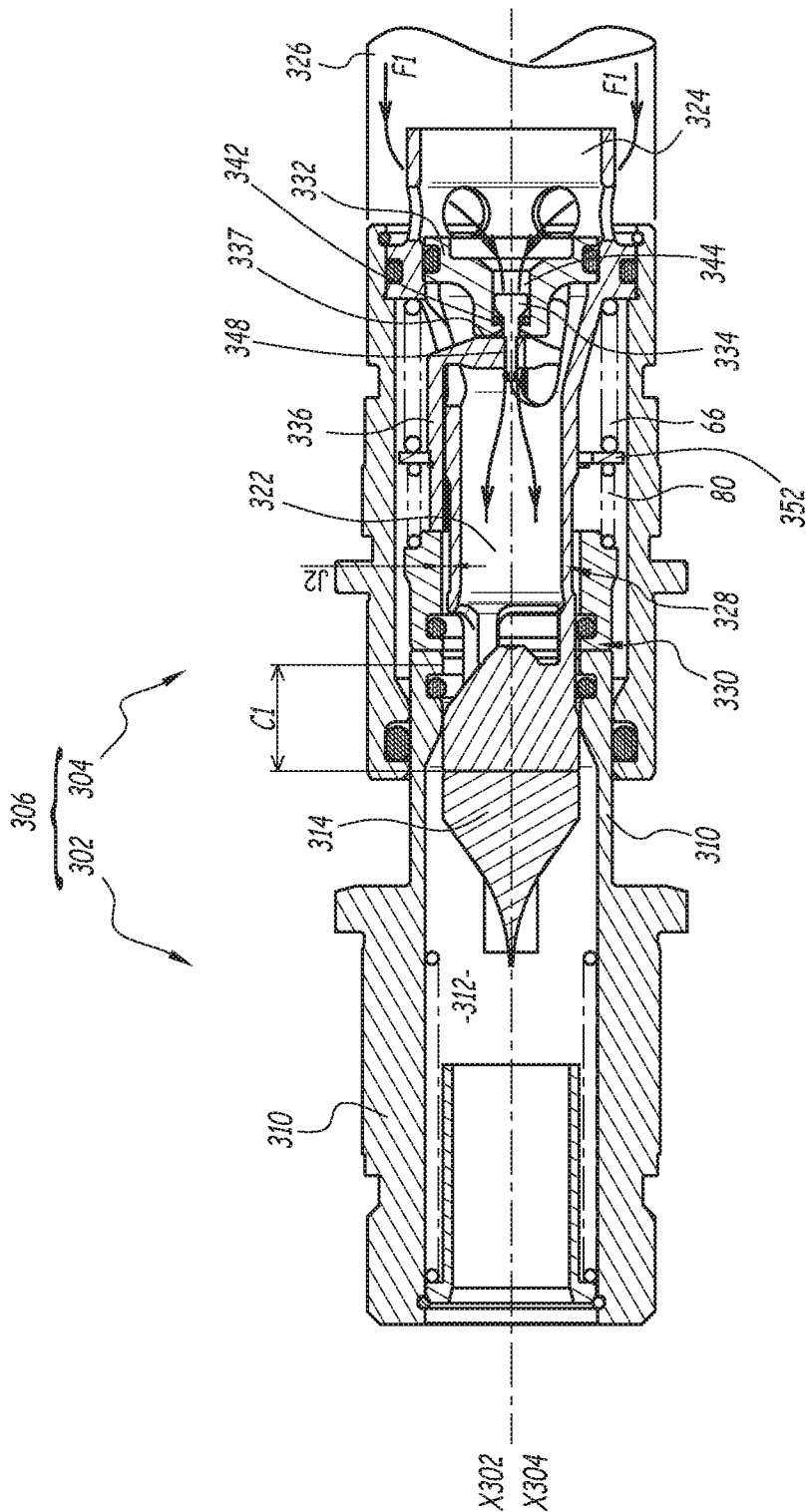
FIG. 13 is a schematic illustration of the coupling device of FIG. 12, in which the safety valve is in an open position.
Figure 14:
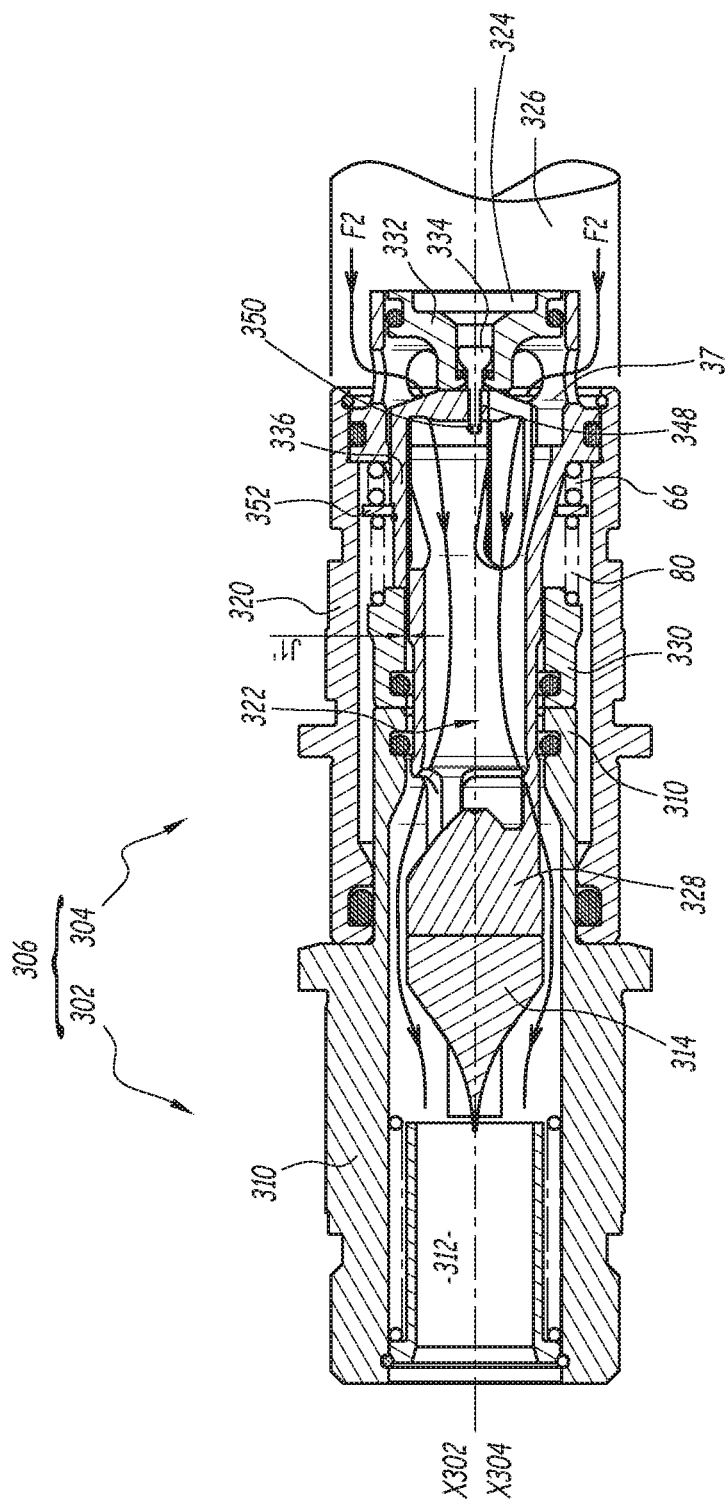
FIG. 14 is a schematic view of the coupling device of FIGS. 12 and 13, illustrated in a coupled configuration.

FIGS. 12 to 14 show a third embodiment of the invention, in which a male coupling element 302 is suitable for being coupled by fitting in a female coupling element 304 to form a coupling device 306 allowing the circulation of a fluid. The coupling elements 302 and 304 according to this third embodiment are intended to play a same role as the coupling elements previously described.

The components of these coupling elements 302 and 304 that are similar to those of the first and/or second embodiments are not described in more detail, since the descriptions thereof done above can be transposed to them.

In this third embodiment, the coupling elements 302 and 304 are mounted on plates 308 intended to be brought closer to one another to promote the fitting of the elements 302 and 304, then to be kept close to one another when the elements 302 and 304 are coupled. The plates 308 extend perpendicular to the respective longitudinal axes X302 and X304 of the elements 302 and 304.

One significant difference relative to the first and second embodiments is that the forward, safety and main valves previously described here belong to the female element 304.

The male element 302 includes a male body 310 that defines an inner pipe 312 and a male valve 314 translatable in the male pipe 312, along the longitudinal axis X302, between a closed position and an open position of a front orifice of the element 302. A spring 316 pushes the male valve 314 back toward its closed position. The plate 308 of the element 302 is secured to the male body 310. The male valve 314 here includes a sealing gasket 318 similar the sealing gasket 36.

The female element 304 includes a female body 320 that delimits an inner pipe 321 similar to the inner pipe 16 and that includes a front orifice 323, an intermediate chamber 322 and a rear chamber 324 that play the same role as the chambers 26 and 24, respectively.

The rear chamber 324 is able to contain a pressurized fluid and emerges on a rear orifice of the element 304 that extends through a pipe 326 for example connected to a pipe or a pressurized fluid reservoir, not illustrated. In the illustrative example of the coupling device 306, the pressurized fluid is provided to flow from the element 304 toward the element 302.

The female body 320 comprises a piston 328 radially and longitudinally secured to the female body. The piston 328 is in the shape of a part of revolution around the longitudinal axis X304 in which passages are arranged for the fluid.

The female element 304 includes a slide valve 330 translatable along the longitudinal axis X304, which acts as forward valve similar to the forward valve 30. The forward valve 330 is inserted radially between the piston 328 and the female body 320 and movable between a closed position in which the forward valve 330 cooperates tightly with the female body 320 and the piston 328 and in which the forward valve 330 is guided radially by the female body 320, and a retracted open position of the inner pipe 321 at the forward orifice 323.

The element 304 also includes a main valve 332, a safety valve 334 and a plunger 336, which play a role similar to the valves 32 and 34 and the plunger 54, respectively.

The plunger 336 has a bell shape and is mounted partially around the piston 328 and partially inside the piston 328. The main valve 332 in the closed position abuts forwardly against the piston 328 when the coupling element 304 is uncoupled. The sealing between the main valve 332 and the piston 328 is done by a radial sealing gasket 340 arranged between the main valve 332 and the piston 328.

The safety valve 334 is in the shape of a part of revolution and cooperates in the closed position with a seat 342 of the main valve and closes a secondary passage 344 in the rear chamber 324 and the intermediate chamber 322 through the main valve 332. A front rod 348 of the safety valve 334, protruding in front of the seat 342 and in front of the main valve 332, is engaged with reduced radial play in the plunger 336. Unlike the first and second embodiments, the plunger 336 is not engaged in the main valve 332. A stop segment 350 secured to the front rod 348 limits the movement of the plunger 336 forward relative to the safety valve 334. A shoulder 349 facing forward is arranged on the front rod 348.

A bearing part 352, playing the same role as the bearing part 64, is arranged in the chamber 322 while being mounted coaxially around the piston 328 and the plunger 336. The bearing part 352 is kept longitudinally secured to the plunger 336 between a stop segment and a shoulder of the plunger 336. The springs 80 and 66 are arranged radially outside the piston 328. The spring 80 is inserted between the bearing part 352 and the piston 328. The spring 66 is inserted between the part 352 and a base of the forward valve 330. The turns of the springs 80 and 66 are aligned along the axis X304. When the coupling element 304 is in the uncoupled configuration, the spring 66 returns the plunger 336 forward, by means of the bearing part 352. It should be noted that the bearing part 352 here does not provide radial guiding of the plunger 336. This guiding is guaranteed by the outer surface of the piston 328. In its forward position, the plunger 336 abuts forwardly against the safety valve 334, the safety valve abutting forwardly against its seat 342 on the main valve 332 and the main valve 332 abutting forwardly against the piston 328.

When the plunger 336 is in the forward position and the safety valve 334 is in the closed position, the distance D2 is defined between a rear face of the plunger 336 and the shoulder 349 that are intended to come into contact with one another for the movement of the safety valve 334 toward its open position.

During coupling, the male valve 314 comes into contact against the head of the piston 328 and withdraws relative to the male body 310. At the same time, the male body 310 pushes the forward valve 330 back toward its open position against the spring 80, the spring 66 developing a return force much greater than the return force of the spring 80. The forward valve 330, by withdrawing, bears on the front face of the plunger 336, after a travel by the value of the distance D3 defined as before, and pushes it backwards. The plunger 336 withdraws until it bears on the shoulder 349 of the rod 348 to push the safety valve 334 back and thus open the secondary passage 344 between the rear chamber 324 and the intermediate chamber 322. The opening of the secondary passage 344 is done after the fluid communication between the inner pipe 312 and the intermediate chamber 322 is effective, since the travel C1 defined as before is less than the sum of the distance D2 and the distance D3. The stream F1 of fluid then flows toward the intermediate chamber 322, then toward the inner pipe 312, which decreases the pressure in the rear chamber 324. In this configuration, the forward valve 330 is no longer guided radially by the female body 320.

The fitting movement of the elements 302 and 304 continues, such that the plunger 336 continues to withdraw until the rear face 337 of the plunger 336 comes into contact with a front face 339 of the main valve 332, which it pushes back into its open position. The stream F2 of fluid greater than the stream F1 then flows at the main passage 37 around the main valve 332, between the female body 320 and the main valve 332, from the rear chamber 324 to the intermediate chamber 322. In this configuration, the forward valve 330 is guided radially by the outer radial surface of the piston 328. In other words, the forward valve 330 is guided radially here by an element secured to the body 320. The radial play J1, J1' between the piston 328, secured to the body 320, and the forward valve 330 in its closed position, respectively in its open position, is smaller than the radial play J2 between the piston 328 and the forward valve 330 in the configuration of FIG. 13, in which the forward valve 330 is in an intermediate longitudinal position between its closed position and its open position, due to a local narrowing of the outer diameter of the piston 328.

During uncoupling, all the elements 302 and 304 begin to be moved away from one another, the plunger 336 follows the withdrawal movement of the forward valve 330, while maintaining contact between the plunger 336 and the forward valve 330, since the return force of the spring 66 is greater than the return force of the spring 80. The plunger 336 abuts against the stop segment 350 and drives the safety valve 334 toward its closed position abutting against its seat 342. The secondary passage 344 is thus closed and the stream F1 is interrupted. The spring 66 in turn exerts its return force also on the main valve 332, which closes in turn. The intermediate chamber 322 is isolated from the rear chamber 324, and the stream F2 is interrupted in turn. At this stage, the fluid communication between the inner chamber 312 and the intermediate chamber 322 is still effective. Next, the spring 80 pushes the forward valve 330 back into its closed position.

To guarantee the closing of the safety valve 334 before the closing of the main valve 332, it is possible to provide an additional spring that bears on the safety valve 334 and on the main valve 332 or the female valve 320 and that pushes the safety valve 334 back into the closed position.

The embodiments and alternatives and embodiments considered above may be combined to create new embodiments. In particular, it is possible to provide a safety valve and a plunger both in the male element and the female element that are intended to be coupled to form the coupling device, when one or the other of the inner pipes may be subjected to a high fluid pressure.

The ball forming the safety valve 34 can be replaced in the first and second embodiments by a cylindrical safety valve.

The invention claimed is:

1. A fluid coupling element, comprising:
   a body that delimits an inner pipe extending along a longitudinal axis, the inner pipe comprising a rear chamber and an intermediate chamber, in which a front orifice of the inner pipe emerges;
   a main valve translatable in the rear chamber between a closed position, in which the main valve abuts forwardly against the body, and an open position in which a main passage is arranged between the main valve and the body for a fluid communication between the rear chamber and the intermediate chamber;
   a forward valve, translatable in the intermediate chamber between a closed position and an open position of the front orifice, the forward valve being pushed back toward the closed position by a first spring;
   a safety valve, translatable between an open position of a secondary passage arranged through the main valve between the rear chamber and the intermediate chamber, and a closed position of the secondary passage, in which the safety valve abuts forwardly against the main valve;
   a plunger movable in the body between a forward position and a withdrawn position, the plunger being movable relative to the safety valve along the longitudinal axis;
   the coupling element being arranged such that, during coupling with a complementary coupling element during which the forward valve is moved toward the open position of the front orifice, the forward valve comes into contact with the plunger and moves the plunger toward the withdrawn position, the plunger coming into contact with the safety valve and moving the safety valve into the open position of the secondary passage before the main valve is moved toward the open position;
      wherein the coupling element includes a second spring, arranged in the intermediate chamber bearing on the body and on a bearing part of the plunger and pushing the plunger back toward the forward position, and wherein, in the forward position of the plunger, the main valve and the safety valve are in the closed position, and the plunger abuts against the main valve or against the safety valve such that the plunger is prevented from moving further forward.

2. The coupling element of claim 1, wherein, in the forward position, the plunger abuts against the main valve and in that the coupling element includes a third spring that returns the safety valve into the closed position of the secondary passage.

3. The coupling element of claim 2, wherein, in that the third spring is inserted between the safety valve and the main valve.

4. The coupling element of claim 2, wherein the plunger abuts against the main valve by means of at least one ball housed in a longitudinal slot of the main valve and in a peripheral groove of the plunger.

5. The coupling element of claim 1, wherein, in the forward position, the plunger abuts forwardly against the safety valve, or against a stop segment secured to the safety valve, and in that a forward rod of the safety valve, protruding in front of the main valve, is engaged in the plunger.

6. The coupling element of claim 1, wherein the coupling element is arranged such that, during coupling with a complementary coupling element, the plunger or the safety valve comes into contact with the main valve to move the main valve from the closed position toward the open position.

7. The coupling element of claim 1, wherein the first spring is arranged bearing on the forward valve and on the bearing part of the plunger.

8. The coupling element of claim 7, wherein the first spring and the second spring are helical compression springs, the turns of which are aligned along the longitudinal axis and arranged in an outer radial position in the inner pipe.

9. The coupling element of claim 1, wherein a return force exerted by the second spring when the plunger is in the forward position is greater than a return force exerted by the first spring when the forward valve and the main valve are in the open position.

10. The coupling element of claim 1, wherein the bearing part of the plunger is suitable for radially guiding the plunger inside the body when the body is moved between the forward position and the withdrawn position, the bearing part of the plunger being placed substantially in a middle of the free length of the plunger when the safety valve is in the open position.

11. The coupling element of claim 1, wherein, in the open position and in the closed position of the front orifice, the forward valve cooperates with the body or with an element secured to the body with a radial play that is smaller than a radial play between the body, respectively the element secured to the body, and the forward valve in an intermediate position of the forward valve between the closed position and the open position of the front orifice.

12. The coupling element of claim 1, wherein the coupling element includes a rear part arranged in the rear chamber and radially guiding the main valve, the rear part forming a rear stop to the movement of the main valve in the body.

13. The coupling element of claim 1, wherein the forward valve is able to come into contact with the plunger only in a direction parallel to the longitudinal axis.

14. The coupling element of claim 1, wherein the bearing part is a part separate from the plunger that is kept abutting against the plunger by the second spring.

15. A coupling device including a male coupling element and a female coupling element with complementary shapes and able to fit in one another to guarantee a fluid connection of an inner pipe of the male coupling element with an inner pipe of the female coupling element,
   wherein at least one of the male coupling element and female coupling element is according to claim 1,
   and wherein a sum of:
      a distance along the longitudinal axis between the forward valve in the closed position of the front orifice and the plunger in the forward position, and
      a distance along the longitudinal axis between the plunger in the forward position and the safety valve in the closed position,
   is greater than an opening travel of the forward valve for the fluid communication between the inner pipe of the male coupling element and the inner pipe of the female coupling element.

* * * * *